(12) United States Patent
Shibatoh et al.

(10) Patent No.: US 6,239,229 B1
(45) Date of Patent: May 29, 2001

(54) HEAT-HARDENABLE PAINT COMPOSITIONS

(75) Inventors: Kishio Shibatoh, Kanagawa-Ku; Akito Nukita, Totsuka-Ku, both of (JP); Ingo Lüer, Veitshöchheim (DE)

(73) Assignee: BASF Coatings AG, Munster-Hiltrup (DE)

( * ) Notice: Subject to any disclaimer, the term of this patent is extended or adjusted under 35 U.S.C. 154(b) by 0 days.

(21) Appl. No.: 09/214,811

(22) PCT Filed: Jun. 27, 1997

(86) PCT No.: PCT/EP97/03375

§ 371 Date: Mar. 9, 1999

§ 102(e) Date: Mar. 9, 1999

(87) PCT Pub. No.: WO98/02495

PCT Pub. Date: Jan. 22, 1998

(30) Foreign Application Priority Data

Jul. 12, 1996 (JP) .................................................. 8-183891

(51) Int. Cl.[7] .............................. C08F 20/32; C08G 18/80
(52) U.S. Cl. ...................... 525/329.9; 525/375; 525/437; 525/438
(58) Field of Search ................................ 525/329.9, 375, 525/437, 438

(56) References Cited

U.S. PATENT DOCUMENTS

| | | |
|---|---|---|
| 4,939,213 | 7/1990 | Jacobs, III et al. |
| 5,331,080 | * 7/1994 | Swarup et al. ........................ 528/89 |
| 5,565,243 | * 10/1996 | Mauer et al. ........................ 427/409 |
| 5,593,735 | * 1/1997 | Wu et al. ............................ 525/329.9 |

FOREIGN PATENT DOCUMENTS

| | | | |
|---|---|---|---|
| 32 44 004 A1 | 11/1982 | (DE) | ................................ C09D/3/66 |
| 0 594 071 A1 | 10/1992 | (EP) | ............................. C09D/201/02 |
| WO 93/20122 | 10/1993 | (EP) | ............................... C08G/63/42 |
| 0 604 922 A1 | 12/1993 | (EP) | ............................. C08K/5/3492 |
| WO 96/15185 | 11/1994 | (EP) | ............................. C08K/5/3492 |

* cited by examiner

*Primary Examiner*—James J. Seidleck
*Assistant Examiner*—Olga Asinovsky

(57) ABSTRACT

To obtain paint compositions with which it is possible to form paint films which have excellent acid resistance, weather resistance and heat resistance and which also have excellent yellowing resistance. A heat hardenable paint composition which contains (A) polyol which has in each molecule two or more sterically protected secondary hydroxyl groups, being a polyol obtained by means of an esterification reaction of an epoxy group containing compound which has one epoxy group and which does not have a polymerizable unsaturated bond and a carboxyl group containing compound which has two or more carboxyl groups; and (B) 1,3,5-triazine-2,4,6-tris-carbamic acid ester which can be represented by the general formula indicated below, or an oligomer thereof, wherein the mol ratio secondary hydroxyl groups originating from the aforementioned (A) component:NHCOOR groups originating from the aforementioned (B) component in the composition is from 1:3 to 3:1.

General Formula $$C_3N_3(NHCOOR)_3$$

(In this formula, R represents an alkyl group which has from 1 to 20 carbon atoms, an aryl group which has from 6 to 20 carbon atoms or an aralkyl group which has from to 20 carbon atoms.)

19 Claims, No Drawings

HEAT-HARDENABLE PAINT COMPOSITIONS

FIELD OF THE INVENTION

This invention concerns heat-hardenable paint compositions and, more precisely, it concerns heat-hardenable paint compositions which are suitable as top-coat paints for use on automobiles.

BACKGROUND OF THE INVENTION

A pressing need for the development of paints which have excellent durability in terms of weather resistance and acid resistance in respect of rain marks caused by acid rain has arisen in recent years.

For example, paint compositions with hydroxyl group containing acrylic resin and/or polyester resin, alkyl etherified melamine resin, non-yellowing polyfunctional blocked isocyanate and organotin based compounds as the main components, of which the hardening reaction of the main resin and the crosslinking agent is complex and with which paint films which have excellent acid resistance and scratch resistance are obtained by taking the unreacted melamine resin and the unreacted hydroxyl groups into the crosslinks, have been disclosed in Japanese Patent Kokai H4-246483 (1992).

However, although non-yellowing isocyanate is used, the paint compositions referred to above can hardly be said to have a degree of yellowing which is satisfactory for a practical paint film, and neither is the actual degree of yellowing clarified in the illustrative examples. Moreover, the paint compositions referred to above contain alkyl etherified melamine resins and so the resistance to hydrolysis of the crosslink parts is poor and the acid resistance of the hardened paint films is inadequate.

Furthermore, hardenable compositions which contain polyfunctional hydroxyl group containing materials, 1,3,5-triazine-2,4,6-tris-carbamic acid esters and acid hardening catalysts have been disclosed in Japanese Patent Kokai H6-228305 (1994), and it is stated that paint films which release little formaldehyde and which have excellent acid resistance can be obtained.

However, these compositions are inadequate in terms of weather resistance and thermal stability, and paint film defects such as cracking and loss of gloss due to exposure to ultraviolet radiation are liable to occur with paint films which have been formed under hardening conditions of temperature above 140° C. in particular.

The aim of this invention is to provide heat-hardenable paint compositions with which paint films which have excellent acid resistance, weather resistance, heat resistance and yellowing resistance can be formed in order to resolve the problems outlined above.

SUMMARY OF THE INVENTION

As a result of thorough research, the inventors have discovered that the crosslinking bonds which are formed by the ester exchange of sterically protected secondary hydroxyl groups and carbamic acid esters are stable with respect to light and heat and chemically stable, and the invention is based upon this discovery.

That is to say, the present invention provides the following heat-hardenable paint compositions:
(1) A heat-hardenable paint composition which contains (A) polyol which has in each molecule two or more sterically protected secondary hydroxyl groups, being a polyol obtained by means of an esterification reaction of an epoxy group containing compound (A1) which has one epoxy group and which does not have a polymerizable unsaturated bond and a carboxyl group containing compound (A2) which has two or more carboxyl groups; and (B) a 1,3,5-triazine-2,4,6-tris-carbamic acid ester which can be represented by general formula (1) indicated below, or an oligomer thereof, wherein the mol ratio secondary hydroxyl groups originating from the aforementioned (A) component:NHCOOR groups originating from the aforementioned (B) component in the composition is from 1:3 to 3:1.
General Formula (1)

$$C_3N_3(NHCOOR)_3 \quad (1)$$

(In this formula, R represents an alkyl group which has from 1 to 20 carbon atoms, an aryl group which has from 6 to 20 carbon atoms or an aralkyl group which has from 7 to 20 carbon atoms, and these groups may be the same or different.)
(2) A heat-hardenable paint composition which contains (A) polyol which has in each molecule two or more sterically protected secondary hydroxyl groups, being a polyol obtained by means of an esterification reaction of an epoxy group containing compound (A1) which has one epoxy group and which does not have a polymerizable unsaturated bond and a carboxyl group containing compound (A2) which has two or more carboxyl groups; (B) 1,3,5-triazine-2,4,6-tris-carbamic acid ester which can be represented by general formula (1) indicated below, or an oligomer thereof; and (C) acrylic polyol which has primary hydroxyl groups, wherein the mol ratio secondary hydroxyl groups originating from the aforementioned (A) component:hydroxyl groups originating from the aforementioned (C) component in the composition is from 100:0 to 100:100, and the mol ratio of all the hydroxyl groups originating from the aforementioned (A) and (C) component:NHCOOR groups originating from the afore-mentioned (B) component in the composition is from 1:3 to 3:1.
General Formula (1)

$$C_3N_3(NHCOOR)_3 \quad (1)$$

(In this formula, R represents an alkyl group which has from 1 to 20 carbon atoms, an aryl group which has from 6 to 20 carbon atoms or an aralkyl group which has from 7 to 20 carbon atoms, and these groups may be the same or different.)

DETAILED DESCRIPTION OF THE INVENTION

In this invention, the term "(meth)acrylic" signifies "acrylic" and/or "methacrylic".

Furthermore, the term "primary hydroxyl group" signifies a "hydroxyl group in a structure where two i hydrogen atoms are bonded to the carbon atom to which the hydroxyl group is bound", and the term "secondary hydroxyl group" signifies a "hydroxyl group in a structure where one hydrogen atom is bonded to the carbon atom to which the hydroxyl group is bound".

The epoxy group containing compounds (A1) used in the invention are compounds which have one epoxy group and no polymerizable unsaturated bond within the molecule, and they preferably have no functional group other than the epoxy group, although they may have such groups.

Actual examples of the epoxy group containing compounds (A1) include versatic acid glycidyl ester, p-tertbutylbenzoic acid glycidyl ester, tertiary fatty acid glycidyl esters, styrene oxide, cyclohexane oxide, glycitol and the $C_3$–$C_{20}$ alkyl glycidyl esters, $C_3$–$C_{20}$ alkyl glycidyl ethers and phenyl glycidyl ether. Varsatic acid glycidyl ester and p-tert-butylbenzoic acid glycidyl ester are preferred from among these compounds.

Commercial products can also be used for the epoxy group containing compound (A1). Actual examples of such commercial products include "Kardura E10" (trade name for varsatic acid glycidyl ester, manufactured by the Yuka Shell Epoxy Co.), "PES-10" (trade name for p-tert-butylbenzoic acid glycidyl ester, manufactured by the Fuso Kagaku Co.), and "Equatate 9G" and "Equatate 13G" (trade names for tertiary fatty acid glycidyl esters, manufactured by the Idemitsu Sekiyu Kagaku Co.).

A single epoxy group containing compound (A1) can be used alone, or two or more of these compounds can be used in combination.

The carboxyl group containing compounds (A2) used in the invention are compounds which have two or more terminal carboxyl groups in the molecule, and they preferably have no functional group other than the carboxyl groups, although they may have such groups.

Actual examples of the carboxyl group containing compounds (A2) include acrylic resins, polyester resins, fluorine resins and silicone resins. One of these can be used alone, or two or more can also be used in combination.

In those cases where the carboxyl group containing compound (A2) is an acrylic resin, the acrylic resin which contains carboxyl groups is obtained by the polymerization or copolymerization of vinyl type monomers which have carboxyl groups, such as acrylic acid, methacrylic acid, ethacrylic acid, propylacrylic acid, isopropylacrylic acid, crotonic acid, maleic acid, fumaric acid, itaconic acid, maleic acid half-esters, itaconic half-esters and acrylic acid dimer for example.

Vinyl type monomers which do not have carboxyl groups, for example esters of acrylic acid or methacrylic acids such as methyl (meth)acrylate, ethyl (meth)acrylate, propyl (meth)acrylate, n-butyl (meth)acrylate, isobutyl (meth) acrylate, tert-butyl (meth)acrylate, 2-ethylhexyl (meth) acrylate, stearyl (meth)acrylate, dodecyl (meth)acrylate, cyclohexyl (meth)acrylate, benzyl (meth)acrylate, phenyl (meth)acrylate, dimethylaminoethyl (meth) acrylate and diethylamino (meth)acrylate, and also styrene, a methylstyrene, vinyltoluene, acrylonitrile, methacrylonitrile, vinyl acetate, vinyl propionate, acrylamide, methacrylamide, methylolacrylamide, methylolmethacrylamide, vinyl chloride, propylene, ethylene and the $C_4$–$C_{10}$ (x-olefins can also be copolymerized along with the monomers which have carboxyl groups such as those indicated above.

In those cases where the carboxyl group containing compound (A2) is a polyester resin, a polyester resin of this type is obtained by the esterification in the usual way of a polybasic acid which has two or more carboxyl groups per molecule and a polyhydric alcohol which has two or more hydroxyl groups per molecule in the presence of an excess of the polybasic acid.

The acids and alcohols which are generally used can be used for the polybasic acids and polyhydric alcohols mentioned above, and examples of the former include phthalic anhydride, isophthalic acid, terephthalic acid, trimellitic acid anhydride, tetrahydrophthalic anhydride, hexahydrophthalic anhydride, hymic anhydride, succinic anhydride, adipic acid, sebacic acid, azelaic acid, dodetane dicarboxylic acid and maleic anhydride. Examples of the latter include ethylene glycol, propylene glycol, 1,5-pentanediol, 1,6-hexanediol, diethylene glycol, neopentyl glycol, glycerine, trimethylolethano, trimethylolpropane, pentaerythritol, ditrimethylolpropane and cyclohexanedimethanol.

The polyols (A) used in the invention are polyols obtained by subjecting the aforementioned epoxy group containing compounds (A1) and carboxyl group containing compounds (A2) to an esterification reaction. Moreover, the carboxyl group containing compound (A2) can be prepared first and then this can be reacted with the epoxy group containing compound (A1), or the production of the carboxyl group containing compound (A2) and the esterification reaction with the epoxy group containing compound (A1) can be carried out at the same time by reacting a mixture of the monomer from which the carboxyl group containing compound (A2) is composed and the epoxy group containing compound (A1).

When reacting an epoxy group containing compound (A1) and a carboxyl group containing compound (A2), the epoxy groups of the (A1) component and the carboxyl groups of the (A2) component react and ester bonds are formed, and the (A1) component is bound as side chains of the (A2) component. At this time the epoxy groups (epoxide rings) undergo ring opening and hydroxyl groups are formed. The hydroxyl groups which are formed in this way are secondary hydroxyl groups which are present within the side chains, and so they are sterically protected with the groups on the outer ends providing steric hinderance. For example, in cases where versatic acid glycidyl ester is used for the epoxy group containing compound (A1), a versatic acid radical is present on the end side of the secondary hydroxyl groups which are produced by the ring opening of the epoxy rings, and the hydroxyl groups are sterically protected by the versatic acid radicals.

The crosslinking bonds which are formed by the ester exchange reaction of carbamic acid esters and such sterically protected secondary hydroxyl groups are chemically stable and stable in respect of light and heat, and so it is possible to form paint films which have excellent acid resistance, weather resistance and heat resistance.

The number average molecular weight of the polyol (A) is from 500 to 30,000, and preferably from 1,000 to 10,000.

The (B) component used in the invention is a 1,3,5-triazine-2,4,6-tris-carbamic acid ester which can be represented by the aforementioned general formula (1), an oligomer thereof, or a mixture of these.

Actual examples of R in the aforementioned general formula (1) include alkyl groups which have from 1 to 20 carbon atoms, such as the methyl, ethyl, n-propyl, isopropyl, n-butyl, isobutyl, sec-butyl, tert-butyl, pentyl, hexyl, heptyl, octyl, nonyl, decyl, undecyl, dodecyl, tetradecyl, heptadecyl and eicosyl groups, aryl groups which have from 6 to 20 carbon atoms, such as the phenyl, tolyl, naphthyl and anthryl groups, and the substituted aryl groups where alkyl groups have been substituted in the aromatic rings of these groups, and aralkyl groups which have from 7 to 20 carbon atoms such as the benzyl and phenethyl groups and the substituted aralkyl groups where alkyl groups have been substituted in the aromatic rings of these groups.

The R groups in the aforementioned general formula (1) may be the same or different.

The compounds where R is an alkyl group which has from 1 to 8 carbon atoms are preferred from among the 1,3,5-triazine-2,4,6-tris-carbamic acid esters represented by the aforementioned general formula (1), and 2,4,6-tris (methoxycarbonylamino)-1,3,5-triazine which is represented by the formula $C_3N_3(NHCOOCH_3)_3$, 2,4,6-tris(butoxycarbonylamino)-1,3,5-triazine which is represented by the formula $C_3N_3(NHCOOC_4H_9)_3$, and mixtures of these, are especially desirable.

Furthermore, oligomers where the compounds represented by general formula (1) have been partially condensed with diols can also be used for the (B) component. Examples of the diols which can be used here include ethylene glycol, diethylene glycol, propylene glycol, propanediol, butanediol, pentanediol, hexanediol and neopentyl glycol.

The compounding proportions of the (A) component and the (B) component are such that the mol ratio secondary hydroxyl groups originating from the (A) component:NHCOOR groups originating from the (B) component is from 1:3 to 3:1, and preferably from 1:2 to 2:1.

In those cases where the aforementioned mol ratio is less than 1:3 the gasoline resistance of the hardened paint film is reduced and so this is undesirable, while in those cases where the mol ratio exceeds 3:1 the water resistance of the hardened paint film is reduced and so this is undesirable.

In addition to the aforementioned essential components (A) and (B), acrylic polyols (C) which have primary hydroxyl groups can be compounded in a paint composition of this invention, and by this means it is possible to adjust the performance, for example the scratch resistance, the flex resistance and the impact resistance, as required, in addition to the performance which is the main purpose of the invention.

Actual examples of acrylic polyols (C) include those obtained by the known radical copolymerization of acrylic monomers which contain hydroxyl groups and monomers which have other polymerizable double bonds. Examples of acrylic monomers which contain hydroxyl groups include 2-hydroxyethyl (meth)acrylate, 2-hydroxypropyl (meth)acrylate, 3-hydroxypropyl (meth)acrylate, 4-hydroxybutyl (meth)acrylate, glycerine (meth)acrylate and adducts of 2-hydroxybutyl (meth)acrylate or 2-hydroxypropyl (meth)acrylate with s caprolactone and/or ethylene oxide and/or propylene oxide, and one of these can be used alone or a combination of two or more can be used.

Examples of other monomers which have polymerizable double bonds include methyl (meth)acrylate, propyl (meth)acrylate, n-butyl (meth)acrylate, isobutyl (meth)acrylate, tert-butyl (meth)acrylate, 2-ethylhexyl (meth)acrylate, lauryl (meth)acrylate, stearyl (meth)acrylate, tridecyl (meth)acrylate, cyclohexyl (meth)acrylate, benzyl (meth) acrylate, phenyl (meth)acrylate, dimethylamino (meth) acrylate, diethylamincethyl (meth) acrylate, styrene, α-methylstyrene, vinyltoluene, (meth)acrylonitrile, vinyl acetate, vinyl propionate, (meth)acrylamide, (meth)acrylic acid, crotonic acid, maleic acid, fumaric acid, itaconic acid, maleic acid half-esters, itaconic acid half-esters and acrylic acid dimer, and one of these can be used alone or a combination of two or more can be used.

The acrylic polyols (C) are compounded in such a way that the mol ratio secondary hydroxyl groups originating from the (A) component:hydroxyl groups originating from the (C) component is from 100:0 to 100:100, and preferably from 100:0 to 100:50.

In those cases where the amount of acrylic polyol (C) compound exceeds the upper limit indicated above the acid resistance, weather resistance and heat resistance are not always satisfactory and so this is undesirable.

Furthermore, in those cases where acrylic polyol (C) is compounded, each component is compounded in such a way that the mol ratio of all the hydroxyl groups originating from the (A) and (C) components NHCOOR groups originating from the (B) component is from 1:3 to 3:1, and preferably from 1:2 to 2:1.

In cases where the abovementioned mol ratio is less than 1:3 the gasoline resistance of the hardened paint film is reduced, while in cases where the mol ratio exceeds 3:1 the water resistance of the hardened paint film is reduced, and so this is undesirable.

Other hardener components which can react with hydroxyl groups, other than the (B) component, can also be compounded as auxiliary crosslinking components in a paint composition of this invention. Examples of other hardener components which can react with hydroxyl groups include blocked isocyanate resins, amino resins, melamine resins, silanol resins and alkoxysilane resins. However, from the viewpoint of realizing satisfactorily the effect of the present invention it is desirable that the amount of the other hardener component should be less than 20 wt % of the total amount of the (A), (B) and (C) components.

Furthermore, hardening catalysts other than the abovementioned components can also be compounded in a paint composition of this invention so that hardened paint films can be obtained more efficiently. Examples of hardening catalysts include organotin based catalysts such as dibutyltin dilaurate, dibutyltin diacetate and tin octylate; sulfonic acid based catalysts such as p-toluenesulfonic acid, dodecylbenzenesulfonic acid, dinonylnaphthalenesulfonic acid and dinonylnaphthalenedisulfonic acid; and also phosphoric acid based catalysts and carboxylic acid based catalysts, and one of these can be used alone or they can be used as mixtures of two or more types.

Moreover, the additives which are used conventionally in paints, including colorants such as pigments and dyes, pigment dispersants, viscosity adjusting agents, anti-run agents, leveling agents, anti-gelling agents, ultraviolet absorbers and radical scavengers, for example, can also be added to a paint composition of this invention within ranges such that the purpose of the invention is not lost.

Paint compositions of this invention can be manufactured by mixing the aforementioned (A) and (B) components and the other components as required.

The paint compositions of this invention can be compounded with colored pigments, metallic pigments, dyes or physical pigments, for example, and used as colored paints (solid color finish) or metallic paints for example. Furthermore, they can also be used as clear paints in which little or no pigment is compounded.

No particular limitation is imposed upon the objects which can be painted with a paint comprising a paint composition of this invention, and it is possible to paint metals such as steel sheets, surface treated steel sheets and plastics, for example, and they can be used to paint directly onto these materials or they can be painted as top-coat paints onto painted surfaces where a primer or a primer/mid-coat paint has been applied to the material which is to be painted. In practical terms, they can be used as top-coat paints for automobiles and other vehicles, buildings and structures for example.

A film thickness of some 10 to 60 μm as a dry film thickness is preferred, and the preferred baking conditions for hardening the paint film are a temperature of from about 100° C. to about 180° C. and a time of some 10 to 120 minutes.

Paints comprising paint compositions of this invention can be painted in such a way as to provide the aforementioned dry film thickness by means of the usual painting methods, for example by air spraying, airless spraying, electrostatic painting or dip painting, using one-coat one-bake painting, two-coat one-bake painting, three-coat two-bake painting, or three-coat one-bake painting for example, and a hardened paint film can be formed under the aforementioned baking conditions. When paints comprising a paint composition of this invention are used as top-coat clear paints, any type of paint, such as a solvent based paint, a high-solid paint or a water base paint for example, can be used for the colored base coat.

With the heat hardenable paint compositions of this invention, strong crosslinking bonds are formed in the ester exchange reaction with the carbamic acid ester based hardening agent since the hydroxyl groups of the polyol used for the main resin are secondary hydroxyl groups and sterically protected and, since such a polyol and hardening agent are included in specified amounts, it is possible to obtain paint films which have excellent acid resistance, weather resistance and heat resistance. Moreover, the resistance to yellowing is also excellent since no isocyanate component is included.

Illustrative examples of the invention are described below.

EXAMPLE OF MANUFACTURE 1

(Manufacture of a Polyol which has Two or More Sterically Protected Secondary Hydroxyl Groups Per Molecule)

Xylene (370 parts by weight) was introduced into a four-necked flask which had been fitted with a thermometer, a stirrer, a reflux condenser and a dropping funnel and the temperature was raised to 140° C. Next, a mixture of which the composition is indicated below was added dropwise from the dropping funnel at a constant rate over a period of 3 hours. After completing the drip feed, the mixture was maintained at the reflux temperature for a period of 2 hours and then the contents of the flask were cooled to 100° C. Then, 2 parts by weight of tert-butylperoxy-2-ethylhexanoate and 10 parts by weight of xylene were added and, by maintaining at a temperature of 100° C., with stirring, for a period of 2 hours, the polyol (A-1) solution of residue on heating 60%, resin hydroxyl group value 112 and number average molecular weight 2,500 was obtained.

| | |
|---|---|
| "Kardura E10" (trade name, versatic acid glycidyl ester, manufactured by the Yuka Shell Epoxy Co.) | 300 parts by weight |
| Acrylic acid | 87 parts by weight |
| Isobutyl methacrylate | 213 parts by weight |
| tert-Butylperoxybenzoate | 20 parts by weight |

EXAMPLE OF MANUFACTURE 2

(Manufacture of a Polyol which has Two or More Sterically Protected Secondary Hydroxyl Groups Per Molecule)

A mixture of which the composition is indicated below was introduced into a four-necked flask which had been fitted with a thermometer, a stirrer, a reflux condenser and a dropping funnel and, after raising the temperature to 150° C., with stirring, by continuing the reaction at the same temperature until the solution acid value fell to below 3, the polyol (A-2) solution of residue on heating 80%, resin hydroxyl group value 128 and number average molecular weight 1,750 was obtained.

| | |
|---|---|
| "Kardura E10" (trade name, versatic acid glycidyl ester, manufactured by the Yuka Shell Epoxy Co.) | 1000 parts by weight |
| Pentaerythritol | 136 parts by weight |
| Hexahydrophthalic anhydride | 616 parts by weight |
| Xylene | 438 parts by weight |

EXAMPLE OF MANUFACTURE 3

(Manufacture of an Acrylic Polyol)

Xylene (370 parts by weight) was introduced into a four-necked flask which had been fitted with a thermometer, a stirrer, a reflux condenser and a dropping funnel and the temperature was raised to 140° C. Next, a mixture of which the composition is indicated below was added dropwise from the dropping funnel at a constant rate over a period of 3 hours. After completing the drip feed, the mixture was maintained at the reflux temperature for a period of 2 hours and then the contents of the flask were cooled to 100° C. Then, 2 parts by weight of tert-butylperoxy-2-ethylhexanoate and 10 parts by weight of xylene were added and, by maintaining at a temperature of 100° C., with stirring, for a period of 2 hours, the acrylic polyol (C-1) solution of residue on heating 60%, resin hydroxyl group value 112 and number average molecular weight 3,000 was obtained.

| | |
|---|---|
| 2-Ethylhexyl methacrylate | 284 parts by weight |
| 2-Hydroxyethyl methacrylate | 156 parts by weight |
| Isobutyl methacrylate | 150 parts by weight |
| Acrylic acid | 10 parts by weight |
| tert-Butylperoxybenzoate | 20 parts by weight |

EXAMPLES 1 to 5 a) Preparation of Clear Paints

Clear paints of which the compositions are shown in Table 1 were prepared and diluted to the painting viscosity (Ford Cup #4, 25 seconds at 20° C.) using a thinner ["Sorbesso #100 (aromatic hydrocarbon, boiling point 150–170° C., manufactured by the Esso Co.)/n-butanol=8/2 by weight] and used to form the paint films indicated below.

b) Formation of Paint Films

Cationic electrodeposition paint ("Aqua No.4200". trade name, manufactured by the Nippon Yushi Co.) was electrodeposition painted onto zinc phosphate treated mild steel sheet to a dry film thickness of 20 $\mu$m and then baked at a temperature of 175° C. for 25 minutes, and then a mid-coat paint ("Hiepico No.100 Sealer", trade name, manufactured by the Nippon Yushi Co.) was air spray painted in such a way as to provide a dry film thickness of 40 $\mu$m and baked at 140° C. for 30 minutes and a mid-coat painted sheet was obtained.

In Examples 1 to 3, a solvent type base-coat paint ("Belcoat No.6000 White", trade name, manufactured by the Nippon Yushi Co.) was air spray painted into this mid-coat painted sheet to a dry film thickness of 20 $\mu$m and then set for 5 minutes at room temperature, and then each of the aforementioned clear paints prepared in a) was air spray painted in such a way as to provide a dry film thickness of 40 $\mu$m and then baked at 140° C. for 30 minutes.

On the other hand, in Examples 4 and 5 a water based base-coat paint (a white based paint prepared using titanium oxide for the pigment using the same method as that disclosed in Example 1 of Japanese Patent Kokai H8-10690 (1996)) was air spray painted onto similar electrodeposition/mid-coat painted sheet to that described above so as to provide a dry film thickness of 20 μm and, after flashing for 10 minutes at 80° C., each of the aforementioned clear paints prepared in a) was air spray painted in such a way as to provide a dry film thickness of 40 μm and baked at 140° C. for 30 minutes.

Various tests were carried out using the sheets obtained as samples. The results are shown in Table 3.

COMPARATIVE EXAMPLES 1 AND 2 a) Preparation of Clear Paints

The clear paints shown in Table 2 were prepared and diluted to the painting viscosity (Ford Cup #4, 25 seconds at 20° C.) using a thinner ["Sorbesso #100 (aromatic hydrocarbon, boiling point 150–170° C., manufactured by the Esso Co.)/n-butanol 8/2 by weight] and used to form the paint films indicated below.

b) Formation of Paint Films

In the same way as in Examples 1 to 3, solvent type base-coat paint ("Belcoat No.6000, White", trade name, manufactured by the Nippon Yushi Co.) was painted to provide a dry film thickness of 20 μm on cationic electrodeposition/mid-coat painted sheet and each of the aforementioned clear paints prepared in a) was air spray painted so as to provide a dry film thickness of 40 μm and baked at 140° C. for 30 minutes.

Various tests were carried out using the sheets obtained as samples. The results are shown in Table 3.

TABLE 1

(Amount Compounded, Units: Parts by Weight)

| | | Example | | | | |
|---|---|---|---|---|---|---|
| | | 1 | 2 | 3 | 4 | 5 |
| A-1 | *1 | 83.6 | 73.0 | 58.2 | — | 58.4 |
| A-2 | *2 | — | — | — | 64.1 | — |
| B-1 | *3 | 14.3 | 24.8 | 39.6 | 33.2 | 24.8 |
| C-1 | *4 | — | — | — | — | 14.6 |
| BL-3175 | *5 | — | — | — | — | — |
| Tinuvin 384 | *6 | 1.3 | 1.1 | 1.1 | 1.4 | 1.1 |
| Tinuvin292 | *7 | 0.6 | 0.6 | 0.6 | 0.7 | 0.6 |
| DBTDL | *8 | — | 0.3 | 0.3 | 0.3 | 0.3 |
| BYK306 | *9 | 0.2 | 0.2 | 0.2 | 0.3 | 0.2 |
| TOTAL | | 100.0 | 100.0 | 100.0 | 100.0 | 100.0 |
| Secondary OH group and NHCOOR group mol ratio | | 2/1 | 1/1 | 1/2 | 1/1 | 1/1 |
| Base-Coat | | ST | ST | ST | WB | WB |

TABLE 2

(Amount Compounded, Units: Parts by Weight)

| | | Comparative Example | |
|---|---|---|---|
| | | 1 | 2 |
| A-1 | *1 | — | 65.0 |
| A-2 | *2 | — | — |
| B-1 | *3 | 24.7 | — |
| C-1 | *4 | 72.6 | — |
| BL-3175 | *5 | — | 33.5 |
| Tinuvin 384 | *6 | 1.4 | 0.7 |
| Tinuvin 292 | *7 | 0.7 | 0.4 |
| DBTDL | *8 | 0.3 | 0.3 |

TABLE 2-continued (Amount Compounded, Units: Parts by Weight)

| | | Comparative Example | |
|---|---|---|---|
| | | 1 | 2 |
| BYK306 | *9 | 0.3 | 0.1 |
| TOTAL | | 100.0 | 100.0 |
| Secondary OH group and NHCOOR group mol ratio | | 1/1 | — |
| Base-Coat | | Solvent Type | Solvent Type |

TABLE 3

| | | Examples | | | | | Comparative Examples | |
|---|---|---|---|---|---|---|---|---|
| | | 1 | 2 | 3 | 4 | 5 | 1 | 2 |
| Acid Resistance | *1 | o | o | o | o | o | o | o |
| Accelerated Weather Resistance | *2 | o | o | o | o | o | x | o |
| Heat Resistance Impact Resistance | *3 | 40 cm | 40 cm | 40 cm | 40 cm | 40 cm | <10 cm | 40 cm |
| Yellowing on Baking Resistance | *4 | o | o | o | o | o | o | x |

Notes for Table 3

*1 Acid Resistance: After placing 0.2 ml of 40% aqueous sulfuric acid solution in the form of a spot on the specimen, it was heated to 50° C. for 30 minutes and then rinsed with water, and the extent of staining was assessed visually. The evaluation was made with the standards indicated below.
o: No abnormality
x: Water mark present
*2 Accelerated Weather Resistance: The gloss, color change and staining of the paint film were assessed visually after testing specimens for 3,000 hours with a Sunshine Carbon Arc Lamp (JIS B5400 (1990) 9.8.1). The evaluation was made with the standards indicated below.
o: Virtually no change to be seen in the paint film
Δ: Changes can be seen in the paint film
x: Water staining and color changes seen on the paint surface, and a marked lowering of the gloss
*3,*4 Impact Resistance and Yellowing on Baking Resistance: Impact resistance tests and yellowing on baking resistance tests were carried out after baking at 160° C. for 90 minutes instead of 140° C. for 30 minutes as the baking conditions for the base-coat and the clear-coat. Impact resistance was tested with the DuPont system (JIS K5400 8.3.2) using a 6.35 mm needle tip and a dropping load of 500 grams. The evaluation was made by means of the highest value with which no cracking or peeling was observed at the paint surface. Furthermore, the yellowing on baking resistance was evaluated visually in terms of the state of yellowing of the paint film under the abovementioned baking conditions. The evaluation was made with the standards indicated below.
o: Virtually no change to be seen in the paint film
Δ: Yellowing of the paint film can be seen
x: Pronounced yellowing of the paint film It is clear from the results shown in Table 3 that the paint films of Examples 1 to 5 all had excellent acid resistance, weather resistance, heat resistance, impact resistance and yellowing resistance.

On the other hand, in Comparative Example 1 the hydroxyl groups of the (A) component polyol are primary hydroxyl groups and they are not sterically protected and so the weather resistance and heat resistance are poor.

Furthermore, in Comparative Example 2 a blocked isocyanate is used as a hardening agent and so the yellowing resistance is poor.

What is claimed s:

1. A heat-hardenable paint composition comprising
   (A) one or more polyols having in each molecule two or more sterically protected secondary hydroxyl groups, which one or more polyols are obtained by means of an esterification reaction of
an epoxy group containing compound (A1) having one epoxy group and no polymerizable unsaturated bond, and
a carboxyl group containing compound (A2) having two or more carboxyl groups, and
(B) a 1,3,5-triazine-2,4,6-tris-carbamic acid ester represented by $$C_3N_3(NHCOOR)_3,$$

wherein R is selected from the group consisting of an alkyl group having from 1 to 20 carbon atoms, an aryl group having from 6 to 20 carbon atoms, an aralkyl group which has from 7 to 20 carbon atoms, and mixtures thereof, wherein these groups may be the same or different, or an oligomer thereof,
wherein the mol ratio of secondary hydroxyl groups originating from the aforementioned (A) component:HNCOOR groups originating from the aforementioned (B) component in the composition is from 1:3 to 3:1.

2. A heat-hardenable paint composition comprising
(A) one or more polyols having in each molecule two or more sterically protected secondary hydroxyl groups, which one or more polyols are obtained by means of an esterification reaction of
an epoxy group containing compound (A1) which has one epoxy group and no polymerizable unsaturated bond, and
a carboxyl group containing compound (A2) which has two or more carboxyl groups,
(B) a 1,3,5-triazine-2,4,6-tris-carbamic acid ester represented by $C_3N_3(NHCOOR)_3$,
wherein R is selected from the group consisting of an alkyl group having from 1 to 20 carbon atoms, an aryl group having from 6 to 20 carbon atoms, an aralkyl group which has from 7 to 20 carbon atoms, and mixtures thereof, wherein these groups may be the same or different, or an oligomer thereof, and
(C) acrylic polyol which has primary hydroxyl groups, wherein the mol ratio of secondary hydroxyl groups originating from the aforementioned (A) component:hydroxyl groups originating from the aforementioned (C) component in the composition is from 100:0 to 100:100, and the mol ratio of all the hydroxyl groups originating from the aforementioned (A) and (C) components:HNCOOR groups originating from the aforementioned (B) component in the composition is from 1:3 to 3:1.

3. A heat-hardenable paint composition according to claim 1, wherein the epoxy group containing compound (A1) comprises at least one member selected from the group consisting of versatic acid glycidyl ester, p-tert-butylbenzoic acid glycidyl ester, tertiary fatty acid glycidyl esters, styrene oxide, cyclohexane oxide, glycitol, alkyl glycidyl esters having from 3 to 20 carbon atoms, alkyl glycidyl ethers having from 3 to 20 carbon atoms, phenyl glycidyl ether, and combinations thereof.

4. A heat-hardenable paint composition according to claim 1, wherein the epoxy group containing compound (A1) comprises at least one member selected from the group consisting of versatic acid glycidyl ester, p-tert-butylbenzoic acid glycidyl ester, and combinations thereof.

5. A heat-hardenable paint composition according to claim 1, wherein the carboxyl group containing compound (A2) comprises a member selected from the group consisting of acrylic resins, polyester resins, fluorine resins, silicone resins, and combinations thereof.

6. A heat-hardenable paint composition according to claim 1, wherein the carboxyl group containing compound (A2) comprises a member selected from the group consisting of acrylic resins, polyester resins, and combinations thereof.

7. A heat-hardenable paint composition according to claim 1, wherein the polyol (A) has a number average molecular weight of from 500 to 30,000.

8. A heat-hardenable paint composition according to claim 1, wherein the polyol (A) has a number average molecular weight of from 1000 to 10,000.

9. A heat-hardenable paint composition according to claim 1, wherein R is selected from the group consisting of alkyl groups having from 1 to 8 carbon atoms.

10. A heat-hardenable paint composition according to claim 1, wherein the 1,3,5-triazine-2,4,6-tris-carbamic acid ester comprises a member selected from the group consisting of 2,4,6-tris(methoxycarbonylamino)-1,3,5-triazine, 2,4,6-tris(butoxycarbonylamino)-1,3,5-triazine, and combinations thereof.

11. A heat-hardenable paint composition according to claim 1, wherein the component (B) is an oligomer formed by partially condensing the 1,3,5-triazine-2,4,6-tris-carbamic acid ester with a diol selected from the group consisting of ethylene glycol, diethylene glycol, propylene glycol, propanediol, butanediol, pentanediol, hexanediol, neopentyl glycol, and mixtures thereof.

12. A heat-hardenable paint composition according to claim 1, wherein the ratio of secondary hydroxyl groups to HNCOOR groups is from 1:2 to 2:1.

13. A crosslinked paint film, prepared by applying a heat-hardenable paint composition according to claim 1 to an object and baking the applied composition.

14. A crosslinked paint film, prepared by applying a heat-hardenable paint composition according to claim 2 to an object and baking the applied composition.

15. A crosslinked paint film, prepared by applying a heat-hardenable paint composition according to claim 3 to an object and baking the applied composition.

16. A crosslinked paint film, prepared by applying a heat-hardenable paint composition according to claim 4 to an object and baking the applied composition.

17. A crosslinked paint film, prepared by applying a heat-hardenable paint composition according to claim 6 to an object and baking the applied composition.

18. A crosslinked paint film, prepared by applying a heat-hardenable paint composition according to claim 10 to an object and baking the applied composition.

19. A crosslinked paint film, prepared by applying a heat-hardenable paint composition according to claim 11 to an object and baking the applied composition.

* * * * *